US006897278B2

(12) United States Patent
Wilczek

(10) Patent No.: US 6,897,278 B2
(45) Date of Patent: May 24, 2005

(54) BRANCHED POLYOLEFIN SYNTHESIS

(75) Inventor: Lech Wilczek, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 184 days.

(21) Appl. No.: 10/772,194

(22) Filed: Feb. 4, 2004

(65) Prior Publication Data

US 2004/0167305 A1 Aug. 26, 2004

Related U.S. Application Data

(60) Division of application No. 10/316,454, filed on Dec. 11, 2002, now Pat. No. 6,740,723, which is a continuation-in-part of application No. 09/462,969, filed on Jan. 14, 2000, now Pat. No. 6,518,383, which is a continuation-in-part of application No. PCT/US98/14833, filed on Jul. 16, 1998.
(60) Provisional application No. 60/052,859, filed on Jul. 17, 1997.

(51) Int. Cl.$^7$ .............................................. C08F 114/16
(52) U.S. Cl. ....................... 526/291; 526/296; 526/297; 526/318; 526/319; 526/346
(58) Field of Search ................................ 526/291, 296, 526/297, 319, 318, 346

(56) References Cited

U.S. PATENT DOCUMENTS

| | | |
|---|---|---|
| 3,235,626 A | 2/1966 | Waack |
| 3,390,206 A | 6/1968 | Thompson et al. |
| 3,514,500 A | 5/1970 | Osmond et al. |
| 3,786,116 A * | 1/1974 | Milkovich et al. ........ 525/276 |

FOREIGN PATENT DOCUMENTS

WO    WO 9512568 A1    5/1995

OTHER PUBLICATIONS

R. Asami et al., Prepartion of (p–Vinylbenzyl)polystyrene Macromer, *Macromolecules*, 16, 628–631, 1983.

P. Remp et al., Macromonomers: Synthesis, Characterization and Application, *Advances in Polymer Science*, 58, 3–53, 1984.

Y. Tsukahara et al., Radical Polymerization Behavior of Macromonomers. 2. Comparison of Styrene Macromonomers Having a Methacryloyl End Group and a Vinylbenzyl End Group, *Macromolecules*, 23, 5201–5208, 1990.

K. Ishizu et al., Synthesis of AB Type Diblock Macromonomers, *J. Poly. Sci. Polym. Chem.*, 29, 923–927, 1991.

J. J. Ma et al., Poly(ethylene–co–propylene)–g–polystyrene through Macomer Polymerization: Preparation, Morphology, and Structure—Properties Relationships, *J. Poly. Sci. Polym. Chem.*, 24, 2853–2866, 1986.

P. Chaumont et al., Synthese Anionique de Polymeres Comportant Une Fonction Vinylsilane a L'une ou aux deux extremites de la Chaine Macromoleculaire , *Eur. Polym. J.*, 15, 537–540, 1979.

Y. Gnanou et al., The Ability of Macromonomers to Copolymerize: A Critical Review with New Developments, *Makromol. Chem.*, 190, 577–588, 1989.

M. Arnold et al., On the Reactivity of syryl–Terminated Polystyrene Macromonomers in Anionic Copolymerization with Butadiene, *Makromol. Chem.*, 192, 285–292, 1991.

Slagowski et al., Upper Molecular Weight Limit for the Characterization of Polystyrene in Gel Permeation Chromatography, *Macromolecules*, 7, 394–396, 1974.

Asami et al., Synthesis of Macromers by Means of Living Polymers and their Polymerizabilities, *Makromol. Chem. Suppl.*, 12, 163–173, 1985.

P. Remp et al., Macromonomers: A new class of polymeric intermediates in macromolecular synthesis—II—home and copolymerization, *Makromol. Chem. Suppl.*, 13, 46–66, 1985.

G. Odian, Principles of Polymerization, 1981, Chapter 1 to 3. Linear, branched, and cross–linked polymers, pp. 18 to 20.

* cited by examiner

*Primary Examiner*—William K. Cheung
(74) *Attorney, Agent, or Firm*—Sudhir G. Deshmukh

(57) ABSTRACT

This invention relates to a process for the synthesis of addition polymers containing branches upon branches and having a polymerizable olefin end group by a convenient one-pot polymerization of selected vinyl monomers with chain polymerization initiators and a method to provide olefinic end groups by chain termination agents; and polymers produced thereby characterized by branch-on-branch structure and lower inherent viscosity than heretofore possible.

2 Claims, No Drawings

BRANCHED POLYOLEFIN SYNTHESIS

This application is a divisional of a continuation-in-part of U.S. Ser. No. 10/316,454 filed on Dec. 11, 2002 now U.S. Pat. No. 6,740,723, which is a continuation-in-part of U.S. application Ser. No. 09/462,969, filed Jan. 14, 2000, issued as U.S. Pat. No. 6,518,383 on Feb. 11, 2003, which is a continuation in part of application No. PCT/US98/14833 which claims the benefit of priority from U.S. Provisional Application No. 60/052,859, filed Jul. 17, 1997.

BACKGROUND OF THE INVENTION

Macromolecular engineering using commodity monomers is becoming a major trend in polymer technology to satisfy the demand for new properties, improved cost effectiveness, ecology and quality. Functional polymers with low molecular weight, low polydispersity, compact, branched structures and terminally-located reactive groups are expected to exhibit superior performance/cost characteristics, by virtue of lower inherent viscosity and higher reactivity vs. conventional linear statistical copolymers.

The terminally-functional branched polymers appear to be ultimate reactive substrates for networks, because the branch points can substitute for a significant portion of expensive reactive groups and provide better distribution of the reactive groups. Polymers having large numbers of short branches below critical molecular weight are unlikely to form any entanglements and should exhibit low inherent viscosity and good flow even in concentrated solutions.

Conventional techniques for synthesizing well-defined branched polymers require expensive multistep processes involving isolation of reactive intermediate macromonomers. The macromonomers have polymerizable end groups, which are usually introduced using functional initiator, terminating or chain transfer agent. Well-defined branched polymers are prepared by the macromonomer homopolymerization or copolymerization with suitable low molecular weight comonomer selected based on known reactivity ratios. These methods have been reviewed and only single-branch polymers from single incorporation of the macromonomers are reported; multiple reincorporation of the growing macromonomers was never attempted, e.g., R. Milkovich, et al., U.S. Pat. No. 3,786,116; P. REMP, et al., Advan. Polymer Sci., 58, 1 (1984); J. C. Salamone, ed., Polymeric Materials Encyclopedia, Vol. 3 and 4 (1996).

Several linear macromonomers were prepared by end-capping of living anionic polyolefins with unsaturated terminating agents providing polymerizable olefin end-groups, e.g., R. Asami et al., Macromolecules, 16, 628 (1983). Certain macromonomers have been incorporated into simple graft polymers by homo- or copolymerization with branched structure not well-characterized and reincorporation of the macromonomers into more complex structures was not considered.

Dendrimers or hyperbranched polymers are conventionally prepared using expensive, special multifunctional monomers or expensive multistep methods requiring repetitive isolation of the reactive intermediates. Nothing in the prior art discloses synthetic conditions for production of macromonomers or polymers containing branches upon branches.

SUMMARY OF THE INVENTION

This invention relates to a general process for the synthesis of polyolefins containing branches upon branches and having polymerizable olefin end groups by a convenient one-pot polymerization of selected vinyl monomers with chain polymerization initiators and a method to provide olefin end groups by chain termination agents. The polymerization is carried out in such a manner that chain termination occurs gradually and each chain termination event terminates that particular polymer chain with polymerizable olefinic functionality. Subsequent reincorporation of the linear polymer chains produced early in the reaction leads to branching of subsequently-formed macromolecules which are terminated with polymerizable olefinic functionality. Subsequent reincorporation of the branched macromolecules leads to subsequently-formed polymer molecules containing branches upon branches which are terminated with polymerizable olefinic functionality. Spontaneous repetition of the process leads to highly branched or hyper-branched dendritic products still retaining polymerizable olefinic termini.

This invention concerns an improved process for the anionic polymerization of at least one vinylic monomer to form a branched polymer comprising contacting, in the presence of an anionic initiator:

(i) one or more anionically polymerizable vinylic monomers having the formula $CH_2=CYZ$, and (ii) an anionic polymerization chain terminating agent of formula $CH_2=CZ-Q-X$, wherein:

Q is selected from the group consisting of a covalent bond, $-R'-$, $-C(O)-$, and $-R'-C(O)-$;

Y is selected from the group consisting of R, $CO_2R$, CN, and $NR_2$;

X is selected from the group consisting of halogen, and $RSO_3$;

Z is selected from the group consisting H, R, and CN;

R is selected from the group consisting of unsubstituted and substituted alkyl, vinyl, aryl, aralkyl, alkaryl and organosilanyl groups and R' is selected from the group consisting of substituted or unsubstituted alkylene, arylene, aralkylene, alkarylene and organosilanylene groups; the substituents being the same or different and selected from the group consisting of carboxylic acid, carboxylic ester, hydroxyl, alkoxy and amino;

wherein the improvement comprises obtaining higher yields of branched polymer, the polymer having dense branch upon branch architecture and polymerizable vinylic chain termini, employing steps I, III, VI and at least one of II, IV and V:

I. reacting (i) with an anionic initiator in a first step:

II. decreasing the ratio of (i) to anionic initiator toward 1;

III. adding (ii) optionally with some (i) in a second step;

IV. selecting the rate of the (ii) addition, dependent on the (ii) reactivity;

V. increasing the ratio of (ii) to anionic initiator toward 1; and

VI. increasing the conversion of (i), (ii) and olefinic end groups from 70 to 100%.

Based on the disclosure and Examples presented herein, one skilled in the art can select the optimum steps I–VII with minimum experimentation. One skilled in the art will also be able to select the appropriate anionic initiator and chain transfer agent for the monomer(s) being polymerized, by reference to the well-known conditions for anionic polymerization. Optionally, the process includes the step, VII, of converting anionic-growing end groups into non-polymerizable end groups. It is preferred to operate process step V at a ratio of about 0.7 to 1, most preferably from 0.8 to 1. In step 1V, the rate of addition will vary in the same direction as reactivity of (ii) so that addition will be relatively slow for less reactive component (ii) and will increase commensurate with increased reactivity of component (ii).

This invention further concerns the product of the above reaction which is composed primarily of a polymer having a branch-upon-branch structure and a polymerizable olefinic end group, having the structure:

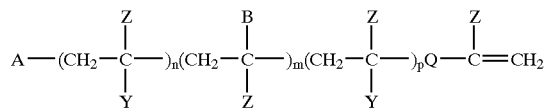

where B =

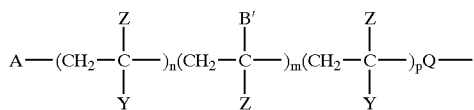

B'=Y,B;

m=1 to 100, preferably 1 to 20, more preferably 1 to 10;
n=0 to 100, preferably 0 to 50, more preferably 1 to 20;
p=0 to 100, preferably 0 to 50, more preferably 1 to 20; and n+m+p≧2, preferably 5 to 50, more preferably 5 to 20;
if m>1, then the m insertions are consecutive or not consecutive;
A=anionic initiator moiety selected from the group consisting of R; and
Q, Y, Z are as earlier defined.

More particulray, A=butyl, Z=H, and Y=Ph, Q=$C_6H_4CH_2$ W is $CZ=CH_2$, a composition of claim 10 wherein W is a non-polymerizable moiety, or H.

Branch-upon-branch polymers (BUBP) are superior over straight branch polymers (SBP) in terms of more compact structure, reflected in lower inherent viscosity and better flow properties in melts and solutions for any given molecular weight of polymers. Therefore, BUBPs require less solvents and lower temperature than SBPs for processing.

BUBPs with terminal end groups are superior over SBP substrates by having much larger network fragments, which can be preformed and incorporated into new topology networks. BUBPs allow formation of new types of hybrid networks by combining different BUBPs with a good control on molecular level.

BUBPs allow incorporation of larger numbers of branch points per macromolecule, which are equivalent to curing sites. This improves economy and conversion of reactive coatings by reducing the number of expensive curing sites.

In general, BUBPs offer at least a 10 percent improvement over SBPs of the same molecular weight in such characteristics as lower viscosity, reduced need for solvent, fewer curing sites in reactive substrates for networks and higher conversion of curing sites in final coatings, all of which provide better product stability.

DETAILS OF THE INVENTION

We have discovered a process for the synthesis of polyolefins containing branches upon branches and having polymerizable olefin end groups by a convenient one-pot polymerization of selected vinyl monomers with chain polymerization initiators and a method to provide olefin end groups by chain-termination agents. The polymerization is carried out in such a manner that chain termination occurs gradually and each chain-termination event terminates that particular polymer chain with polymerizable olefinic functionality. The process is shown in Scheme 1.

Scheme 1

Step 1. Formation of linear macromonomers 1

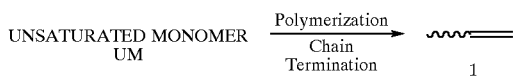

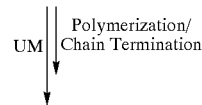

Step 2. Formation of primary branched macromonomers 2

Step 3. Formation of branch-upon-branch macromonomers 3

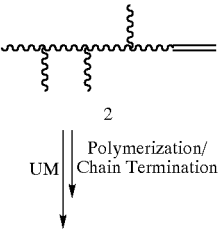

-continued

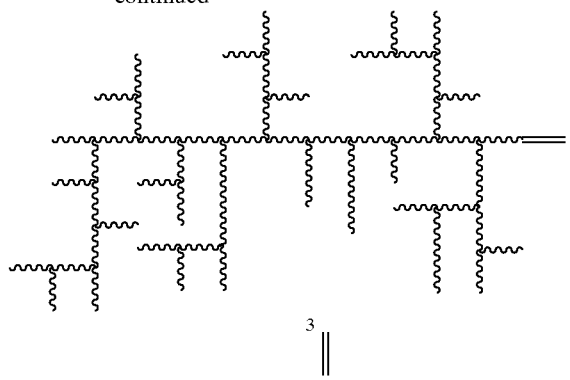

Subsequent incorporation of the linear polymer chains 1 produced early in the reaction leads to branching of subsequently-formed macromolecules terminated with polymerizable olefinic functionality 2. Subsequent reincorporation of the branched macromolecules 2 leads to polymer molecules containing branches upon branches 3 which are terminated with polymerizable olefinic functionality. Spontaneous repetition of the process leads to highly branched or hyperbranched dendritic products still retaining polymerizable olefinic termini.

The polymers made by the present process are useful in a wide variety of applications including coatings, processing aids in extrusion, cast, blown or spray applications in fiber, film, sheet, composite materials, multilayer coatings, photopolymerizable materials, photoresists, surface active agents, dispersants, adhesives, adhesion promoters, compatibilizers and others. End products taking advantage of available characteristics, particularly low inherent viscosity, can include automotive and architectural coatings having high solids, aqueous- or solvent-based finishes.

In a preferred process, the anionic initiator is selected from alkali metals, radical anions, alkyllithium and other organometallic initiating compounds, ester enolates, functionalized initiators, typical examples of which include: butyl-, methyl-, isopropyl-, phenyl-, vinyl-, allyl-lithiums, cumyl potassium, fluorenyl lithium.

Chain termination agents include p-vinylbenzyl chloride and bromide, p-vinylbenzyl tosylate, allyl chloride and bromide, vinyldimethylchlorosilane, vinyl(chloromethyl)dimethylsilane, p-vinylphenyldimethylchlorosilane, methacryloyl chloride.

Substituents Q and X of the chain terminating agent are chosen to convey the appropriate reactivity in the terminating step and in anionic copolymerization of the desired monomer(s) under polymerization conditions.

The process can be conducted by bulk, solution, suspension or emulsion polymerization using batch or preferably starved feed reactor, which offers better process control.

The treelike dendritic branched polymers are formed by in situ generation and copolymerization of first linear and subsequently increasingly branched macromonomers through the polymerizable olefin group (Scheme 1). The method can be employed in anionic polymerization of styrene initiated by alkyllithiums, where dendritic structures are formed by continuous addition of vinylbenzyl halides and/or vinylchlorosilanes acting as chain terminating/functionalizing/branching agents (Scheme 2). The data are consistent with a mechanism, in which the initially-formed linear macromolecules receive predominantly the vinyl end group through the termination by the vinylbenzylhalide or vinylchlorosilane. The vinyl reactive end group allows the linear macromonomer to participate in analogous subsequent (secondary) copolymerization steps leading eventually to even more branched structures ("branch upon branch" or dendrigrafts).

Scheme 2-Synthesis of Dentritic Polystyrenes

1. Linear Polymerization

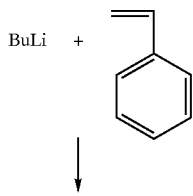

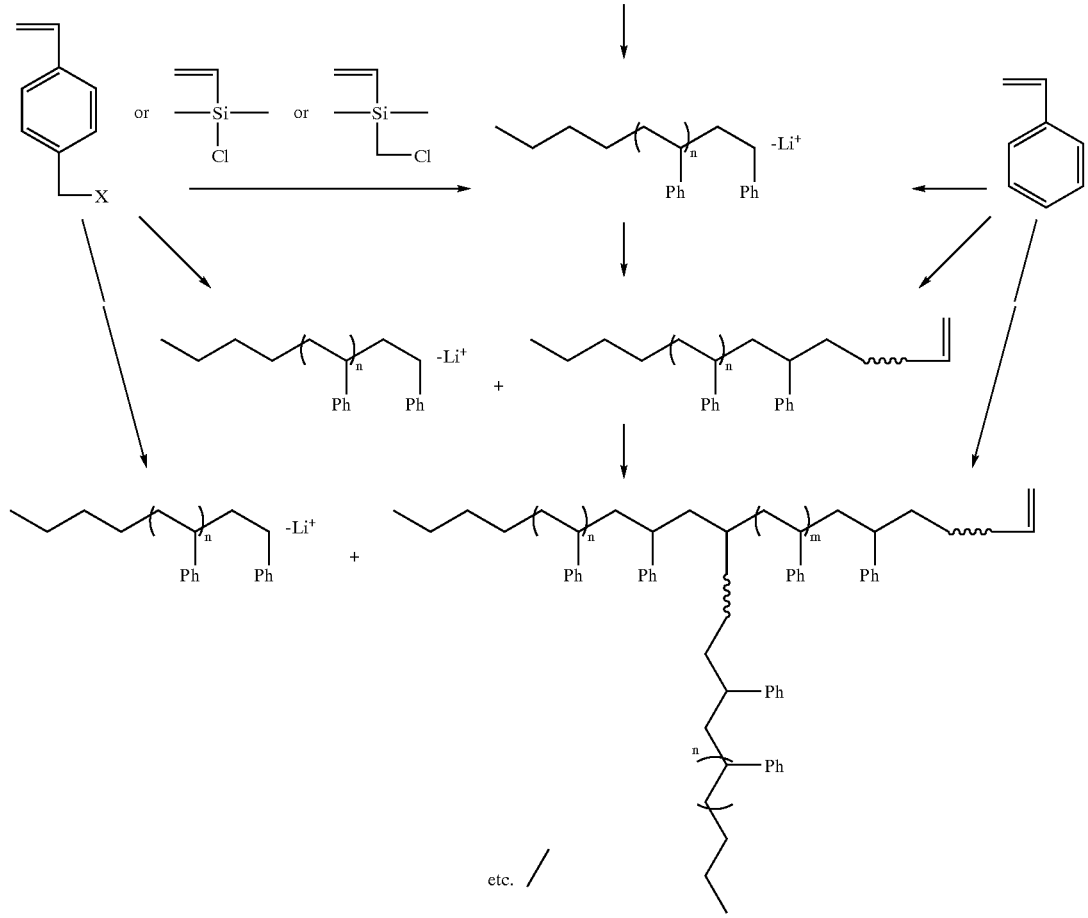

Polystyrenes with molecular weights in the range 3,000–60,000, polydispersity <2.5 with 5 to 40 branches, each containing 3 to 30 monomer units were prepared, primarily controlled by the initiator/monomer/chain terminating agent ratio, relative addition rates, the reactivity ratios of the macromonomer and (co)monomers.

A chain polymerization is controlled by a chain termination step so as to provide a polymerizable olefin end group (Scheme 1). The branch upon branch structure is build by in situ generation and copolymerization of linear and subsequently increasingly branched macromonomers through the polymerizable olefinic group.

The monomer copolymerizability of $CH_2=CYZ$ primarily determined by the steric and electronic properties is well documented in the art. The chain process can involve either one or several different comonomers and is preferably anionic but can also be cationic or radical. Typical monomers include monoolefins, preferably styrene, a-methyl styrene, substituted styrenes, substituted styrenes with protected functional groups, vinyl aromatics, vinylpyridines, conjugated dienes, vinyl silanes, acrylates, methacrylates, acrylonitrile, vinylidene cyanide, alkyl cyanoacrylates, methacrylonitrile, vinyl phenyl sulfoxide, vinyl aldehydes, vinyl ketones and nitroethylenes.

The data are consistent with a mechanism, in which the initially-formed branched macromolecules 2 receive predominantly the olefin end group through the chain termination. See Scheme 1. Having a reactive olefin end group allows 2 to participate in analogous subsequent (secondary) copolymerization steps leading eventually to branch-upon-branch polymers, 3.

Formation of branch-upon-branch structures 3 is indicated by the significant increase (up to 50×) in the polymer molecular weight compared to the control experiments where the same monomer/initiator ratios but nonolefin chain terminating agents such as benzyl chloride or methanol are used instead of the p-vinylbenzyl chloride.

In general, vinylsilane terminated macromonomers show much lower reactivities toward homo- and co-polymerizations under the conditions studied, leading to polymers with lower molecular weight and less branched structures.

Branched structures of copolymers 3 are confirmed by very low inherent viscosities, values of "a" coefficient in Mark-Houwink equation, $[\eta]=K\,M^a$, falling in the range 0.18–0.66 vs. 0.72 for linear polystyrenes, branching factors approaching 0.4 and the RMS radius less than a half of the linear analog of the same molecular weight in the range $10^5$–$10^6$ as measured by GPC with a dual RI/LS detector.

EXAMPLES 1 to 41

Preparation of Branch-Upon-Branch Polystyrenes Using p-Vinylbenzyl Chloride as Chain-Terminating Agent The procedure of Scheme 2 illustrates the preparation and analysis of the branch-upon-branch polymer architecture by a multi-step/one-pot process. Formation of the branch-upon-branch architecture is determined by type of monomer and chain terminating agent (CTA), and by initiator concentration and rate of monomer and CTA addition. The expression "Ph" is used as an abbreviation for phenyl, "PSty" as an abbreviation for polystyrene and "PhMe" is an abbreviation for toluene.

EXAMPLE 1
Polymerization of Styrene with D-Vinylbenzyl Chloride as a Chain-Terminating Agent.

| Part | Ingredient | Amount |
|---|---|---|
| I | THF | 10 ml |
|  | styrene | 2 g |
| II | BuLi (2.0 M in hexane) | 1 g |
| III | p-vinylbenzyl chloride | 0.25 g |
|  | styrene | 0.75 g |

Part I was charged into the dry reactor equipped with a magnetic stirrer and nitrogen-positive pressure, and cooled to −78° C. in a dry ice/acetone mixture in a dry-box. After 15 min., Part II (BuLi) was added at once and the reactor contents were held at −78° C. for an additional 20 minutes. Then, Part III was fed gradually over 5 min. The reactor contents were held at −78° C. for an additional 35 minutes. About 0.5 g of sample was withdrawn followed by GC determination of the styrene and p-vinylbenzyl chloride concentrations. Volatiles were stripped on a rotovap. The polymer was dissolved in methylene chloride, filtered through a silica and volatiles were stripped on high vacuum for several hours and the oligomers/polymers were analyzed by NMR and GPC. Yield 3.0 g, $M_n$=31,600, $M_w/M_n$=2.37 vs. linear PSty in tetrahydrofuran (THF) by GPC. Decane was used as an internal GC standard and molar response factors were determined using mixtures of known composition containing styrene, p-vinylbenzyl chloride and decane. Polymer composition was followed by Matrix Assisted Laser Desorption Ionization (MALDI) Mass Spectroscopy. Polymer molecular weight was measured by GPC using RI, LS and viscosity detectors. Structure of the polymers, including branching density and end groups, was characterized (see Examples 42 to 46) by $^1H$ and $^{13}C$ NMR, MALDI, light scattering, GPC with dual RI/capillary viscometry and RI/LS detectors.

EXAMPLES 2 TO 11

Synthesis of dentritic polystyrenes from BuLi, styrene, vinylbenzyl chloride (VBC), and linear analogs using either benzyl chloride (BC) or benzyl bromide (BB) in cyclohexanes (CHE), THF or in toluene at room temperature. $M_n$ and $M_w/M_n$ by GPC in THF vs. PSty standards; styrene added at once to BuLi/THF in the $1^{st}$ step; and commercial grade substrates used without purification. See Table 1 for results.

TABLE 1

| Example | BuLi (mmol) | Sty (mmol) ($1^{st}$ + $2^{nd}$ steps) | CTA (mmol) | Solvent (ml) | $M_n$ (GPC) | $M_w/M_n$ (GPC) | $M_n$/th.[a] linear | Tg (° C.) | Yield (g) |
|---|---|---|---|---|---|---|---|---|---|
| 2 | 3.040 | 1.92 | 1.97 (VBC) | 1.1 CHE | 17,000 | 2.39 | 240 |  | 0.14 |
| 3 | 0.912 | 28.8 + 1.92 | 0.655 (VBC) | 5 THF | 31,700 | 2.38 | 3.680 | 90 | 2.8 |
| 4 | 6.080 | 3.84 | 5.24 (VBC) | 1 THF | 19,300 | 2.11 | 240 |  | 0.1 |
| 5 | 3.040 | 19.2 + 1.92 | 1.97 (VBC) | 5 THF | 13,900 | 4.70 | 898 | 73 | 2.6 |
| 6 | 3.040 | 19.2 + 1.92 | 2.37 (BC) | 5 THF | 12,800 | 2.65 | 871 | 71 | 2.5 |
| 7 | 0.912 | 1.92 | 0.655 (VBC) | 3 PhMe | 6,600 | 3.86 | 393 |  | 0.16 |
| 8 | 3.040 | 19.2 + 1.92 | 1.97 (VBC) | 5 PhMe | 12,900 | 3.46 | 898 | 72 | 2.6 |
| 9 | 6.080 | 19.2 + 5.76 | 3.93 (VBC) | 5 PhMe | 17,200 | 5.01 | 602 | 74 | 2.1 |
| 10 | 9.12 | 19.2 + 9.60 | 6.55 (VBC) | 5 PhMe | 7,800 | 5.51 | 503 | 55 | 1.1 |
| 11 | 9.12 | 19.2 + 9.60 | 7.90 (BC) | 5 PhMe | 5,700 | 1.36 | 476 | 53 | 2.3 |

[a]$M_n$th = Sty(g)/BuLi (mole) + 57 + MW (CTA) − MW (halogen)

EXAMPLES 12 TO 31

Synthesis of dentritic polystyrenes from BuLi, styrene, vinylbenzyl chloride (VBC), vinylbenzyl bromide (VBB), and linear analogs using either benzyl chloride (BC) or benzyl bromide (BB), or methanol in THF at −78° C. $M_n$ and $M_w/M_n$ by GPC in THF vs. PSty standards; BuLi added at once to styrene/solvent in the $1^{st}$ step; and commercial grade substrates were dried over molecular sieves. See Table 2 for results.

TABLE 2

| Example | BuLi (mmol) | Sty (mmol) ($1^{st}$ + $2^{nd}$ steps) | CTA (mmol) | THF (ml) | $M_n$ (GPC) | $M_w/M_n$ (GPC) | $M_n$/th.[a] | Tg (° C.) | Yield (g) |
|---|---|---|---|---|---|---|---|---|---|
| 12[b] | 3.04 | 19.2 + 5.76 | 1.97 (VBC) | 5 | 31,300 | 4.23 | 1,029 | 88 | 2.6 |
| 13[b] | 3.04 | 19.2 + 5.76 | 2.37 (BC) | 5 | 5,800 | 2.84 | 1,002 | 33 | 2.9 |
| 14[b] | 3.04 | 19.2 + 5.76 | 1.64 (VBC) | 5 | 48,100 | 5.67 | 1,029 | 95 | 2.7 |
| 15[b] | 3.04 | 19.2 | 9.38 (MeOH) | 10 | 3,400 | 2.76 | 743 | 47 | 2.1 |
| 16 | 3.04 | 19.2 | 1.97 (BC) | 10 | 3,700 | 2.83 | 832 | 58 | 2.1 |
| 17 | 3.04 | 19.2 | 1.64 (VBC) | 10 | 23,300 | 1.93 | 859 | 89 | 2.2 |
| 18 | 3.04 | 19.2 + 7.20 | 1.64 (VBC) | 10 | 31,600 | 2.37 | 1,079 | 88 | 3.0 |
| 19 | 3.0 | 32.1 + 19.2 | 2.29 (VBC) | 13.3 | 37,900 | 1.93 | 1,954 | 93 | 4.0 |
| 20 | 3.0 | 32.1 + 28.8 | 2.62 (VBC) | 13.3 | 42,900 | 3.08 | 2,287 | 94 | 5.8 |
| 21 | 3.0 | 3.5 + 38.4 | 2.62 (VBC) | 13.3 | 58,200 | 2.95 | 2,621 | 95 | 6.3 |
| 22 | 3.0 | 22.3 | 2.62 (VBC) | 17.4 | 37,700 | 1.90 | 949 | 92 | 2.6 |

TABLE 2-continued

| Example | BuLi (mmol) | Sty (mmol) (1st + 2nd steps) | CTA (mmol) | THF (ml) | $M_n$ (GPC) | $M_w/M_n$ (GPC) | $M_n$/th.[a] | Tg (° C.) | Yield (g) |
|---|---|---|---|---|---|---|---|---|---|
| 23 | 3.0 | 22.3 + 19.2 | 2.62 (VBC) | 17.4 | 48,700 | 2.42 | 1,616 | 92 | 3.9 |
| 24 | 3.0 | 22.3 + 19.2 | 2.49 (VBC) | 17.4 | 51,300 | 2.31 | 1,616 | 94 | 4.2 |
| 25 | 3.0 | 5.58 | 2.62 (VBC) | 4.4 | 23,300 | 2.70 | 368 | 86 | 0.8 |
| 26 | 3.0 | 22.3 | 2.78 (VBB) | 17.4 | 10,200 | 4.54 | 949 | 72 | 2.9 |
| 27 | 3.0 | 22.3 + 19.2 | 2.64 (VBB) | 17.4 | 9,800 | 8.10 | 1,616 | 81 | 4.1 |
| 28 | 3.0 | 28.2 + 19.2 | 2.95 (VBC) | 11.8 | 29,000 | 3.14 | 1,821 | 84 | 4.7 |
| 29 | 3.0 | 22.3 | 2.53 (BC) | 17.4 | 4,100 | 2.53 | 923 | 49 | 2.6 |
| 30 | 3.0 | 22.3 + 38.4 | 2.49 (VBC) | 17.4 | 47,100 | 2.40 | 2,284 | 93 | 5.3 |
| 31 | 3.0 | 22.3 + 67.2 | 2.49 (VBC) | 17.4 | 50,000 | 2.98 | 3,284 | 90 | 8.4 |

[a] $M_n$th = Sty(g)/BuLi (mole) + 57 + MW (CTA) − MW (halogen)
[b] Styrene added at once to BuLi/solvent in the 1st step.

EXAMPLES 32 TO 41

Approaches to dendritic polystyrenes from BuLi, styrene, vinylchlorodimethylsilane (VCD) or vinyl(chloromethyl) dimethylsilane (VCM) in THF at −78° C. $M_n$ and $M_w/M_n$ by GPC in THF vs. PSty standards; BuLi added at once to styrene/solvent in the $1^{st}$ step; and commercial grade substrates dried over molecular sieves. See Table 3 for results.

TABLE 3

| Example | BuLi (mmol) | Sty (mmol) (1st + 2nd step) | CTA (mmol) | THF (ml) | $M_n$ (GPC) | $M_w/M_n$ (GPC) | $M_n$/th.[a] linear | Tg (° C.) | Yield (g) |
|---|---|---|---|---|---|---|---|---|---|
| 32* | 3.04 | 19.2 + 9.60 | 2.49 VCD | 1 (+9) | 3,200 | 1.61 | 1,129 | 51 | 3.4 |
| 33 | 3.04 | 19.2 + 9.60 | 2.07 VC) | 10 | 5,500 | 3.22 | 1,129 | 68 | 3.1 |
| 34 | 3.0 | 32.5 + 28.8 | 2.90 VCD | 11.3 | 6,700 | 2.48 | 2,272 | 76 | 6.7 |
| 35 | 3.0 | 22.3 | 2.49 VCD | 17.4 | 4,800 | 2.19 | 917 | 71 | 2.3 |
| 36 | 3.0 | 22.3 + 19.2 | 2.90 VCD | 17.4 | 6,500 | 2.19 | 1,584 | 72 | 4.2 |
| 37 | 3.04 | 19.2 | 2.60 VCM | 10 | 8,400 | 3.17 | 841 | 70 | 2.3 |
| 38* | 3.04 | 19.2 | 2.60 VCM | 1 (+9) | 2,100 | 1.70 | 841 | 25 | 2.5 |
| 39* | 2.04 | 19.2 + 9.60 | 2.60 VCM | 1 (+9) | 3,300 | 1.80 | 1,143 | 38 | 3.2 |
| 40 | 3.0 | 32.5 | 2.97 VCM | 11.3 | 9,400 | 3.04 | 1,286 | 74 | 3.8 |
| 41 | 3.0 | 22.3 + 19.2 | 2.97 VCM | 17.4 | 6,200 | 2.22 | 1,598 | 71 | 4.4 |

[a] $M_n$th = Sty(g)/BuLi (mole) + 57 + MW (CTA) − MW (halogen)
*In 1 ml THF + 9 ml PhMe at room temperature.

EXAMPLES 42 to 46

Demonstration of Branched Structure of Polystyrenes Prepared Using p-Vinylbenzyl Chloride as Chain-Terminating/ Branching Agent Branched structures were confirmed by very low inherent viscosities, low "a" coefficient in the Mark-Houwink equation falling in the range 0.18–0.66 vs. 0.72 for linear polystyrenes and branching factors approaching 0.4. See Table 4.

TABLE 4

Characterization of Branching in Dendritic Polystyrenes

| Example | IV[a] | $M_w$ LS[b] | $M_w$ SEC[c] | $M_\eta^c$ | $M_w$, Ls[e] | $M_n$, SEC[e] | $g'^d$ $M_w$/SEC[e] | $gw'^c$ | $a^e$ |
|---|---|---|---|---|---|---|---|---|---|
| Control (Linear PSty) | 0.22 | | 34,500 | | 1.03 | | | | 0.72 |
| 42 | 0.28 | 88,300[b] | 79,000[b] | 71,100 | 0.66 | 0.77 | 0.72 | 0.87 | 0.66 |
| 43 | 0.19 | 81,000[b] | 80,000[b] | 63,000 | 0.48 | 0.57 | 0.48 | 0.63 | 0.18 |
| 44 | 0.20 | | 87,800 | | | | 0.48 | | |
| 45 | 0.22 | | 83,800 | | | | 0.56 | | |
| 46 | 0.28 | | 188,700 | | | | 0.39 | | |

[a] measured in THF via capillary viscometry
[b] measured in PhMe
[c] SEC viscometry with universal calibration
[d] g' = ([η]b/{η])$_M$ = [η]/b/$K_{Mb}{}^a$
[e] a = 0.725, K = 11 × $10^{-5}$ (for linear PSty)

What is claimed is:

1. A composition of matter comprising a polymer having a branch-upon-branch structure and optionally a polymerizable olefinic end group, having the structure:

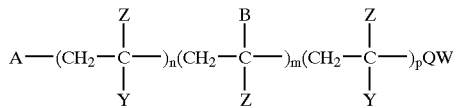

where B =

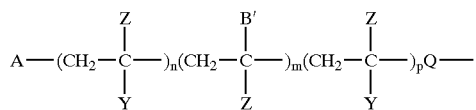

wherein:

B'=Y, B;

m=1 to 100, n=0 to 100, p=0 to 100, n+m+p>2;

and if m>1, then the m insertions are consecutive or not consecutive;

A=anionic initiator moiety R;

Q is selected from the group consisting of a covalent bond, R, C(O), and RC(O);

Y is selected from the group consisting of R, $CO_2R$, CN, and $NR_2$;

W is $CZ=CH_2$ or a non-polymerizable moiety; CN; and

Z is selected from the group consisting H, R, and CN; and

R is selected from the group consisting of unsubstituted and substituted alkyl, vinyl, aryl, aralkyl, alkaryl and organosilanyl groups, the substituents being the same or different and selected from the group consisting of carboxylic acids, carboxylic ester, hydroxyl, alkoxy, primary amino and secondary amino, wherein in (ii) Q=$PhCH_2$ and X=Cl or Br.

2. The process according to claim 1 wherein in (i) Z=H and Y=Ph in (ii) Q=$PhCH_2$ and X=Cl or Br, and BuLi is used as an initiator.